(12) United States Patent
Goodfellow

(10) Patent No.: US 6,188,817 B1
(45) Date of Patent: Feb. 13, 2001

(54) PHOTONICS SYSTEM

(75) Inventor: Robert C Goodfellow, Brackley (GB)

(73) Assignee: Marconi Communications Limited (GB)

(*) Notice: Under 35 U.S.C. 154(b), the term of this patent shall be extended for 0 days.

(21) Appl. No.: 09/394,332

(22) Filed: Sep. 13, 1999

(30) Foreign Application Priority Data

Nov. 28, 1998 (GB) .................................................. 9826108

(51) Int. Cl.$^7$ .................................................. G02B 6/28
(52) U.S. Cl. .................................................................. 385/24
(58) Field of Search ........................... 385/122, 24, 14, 385/31, 39; 359/332, 139, 629, 499, 109, 118

(56) References Cited

U.S. PATENT DOCUMENTS

| | | | |
|---|---|---|---|
| 4,991,938 | * 2/1991 | Buhrer et al. | 359/499 |
| 5,388,001 | * 2/1995 | Okayama et al. | 359/629 |
| 5,606,439 | * 2/1997 | Wu | 385/14 |
| 5,654,812 | * 8/1997 | Suxuki | 359/117 |
| 5,946,129 | * 8/1999 | Xu et al. | 385/122 |

OTHER PUBLICATIONS

Tunable fibre bandpass filter based on a linearly chirped fibre Bragg grating for wavelength demultiplexing, M.G. Xu, et al., Electronic Letters, Sep. 26, 1996, vol. 32, No. 20, pp. 1918–1919.

Fiber Gratings and Applications, James R. Onstott, 3M Company, Presider, P. 106, Cleo'97, Tuesday Afternoon.

Fibre Bragg gratings tuned and chirped using magnetic fields, J.L. Cruz, et al., Electronics Letters, Jan. 30, 1997, vol. 33, No. 3, pp. 235–236.

Combining gratings and filters reduces WDM channel spacing, J.J. Pan, et al., Optoelectronics World, Sep. 1998, pp S11–S17.

8–Channel Tunable Drop Device With Thermal Tuning for 100 GHz Channel Spacing, T. Eftimov, et al., JDS Fitel, Inc., 2 pages.

Evaluation of an Optical Boosted Add/Drop Multiplexer OBADM including circulators and fiber grating filters, Proc. 21$^{st}$ Eur. Conf. on Opt. Comm. (ECOC'95—Brussels), pp. 47–50.

* cited by examiner

Primary Examiner—Akm E. Ullah
(74) Attorney, Agent, or Firm—Kirschstein, et al.

(57) ABSTRACT

A photonics system comprising an optical circulator, comprising a plurality of ports; a first port arranged to receive a plurality of spatially separate optical signals each comprising a plurality of wavelengths; the optical circulator arranged to pass the plurality of optical signals to a second port so as to produce them as spatially separate signals; a plurality of optical wavelength filters arranged at the second port, in which each of the plurality of optical wavelength filters is arranged to align with a different one of the plurality of optical signals at the second port, each of the plurality of optical wavelength filters for selectively reflecting a selection of the plurality of wavelengths comprised in the respective optical signal and selectively passing others of the plurality of wavelengths.

16 Claims, 3 Drawing Sheets

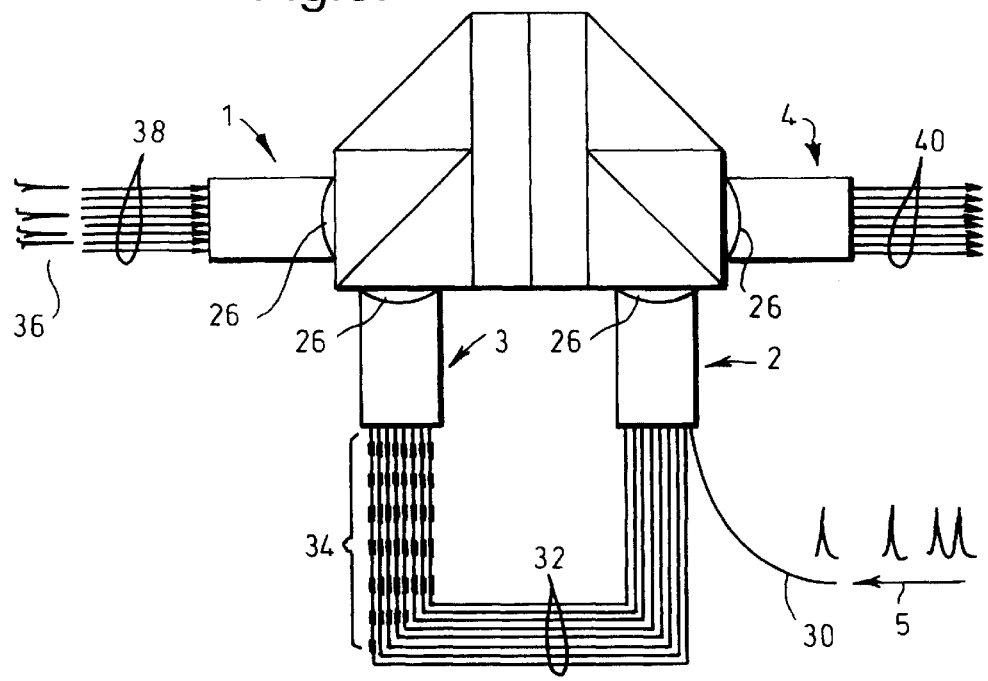
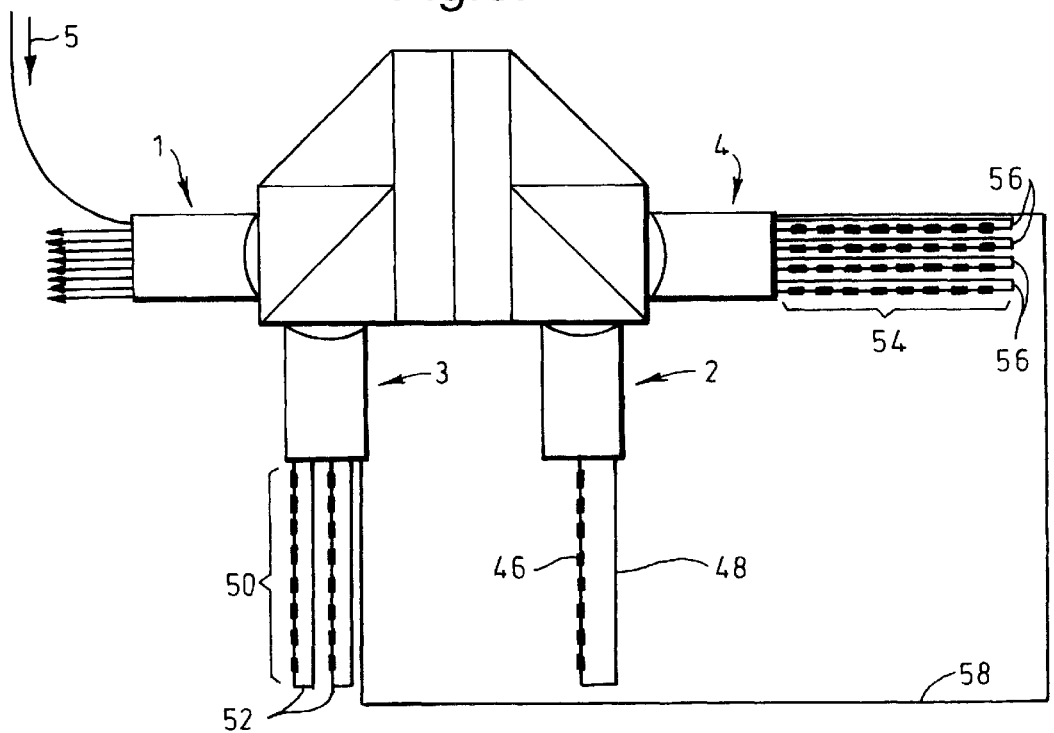

PHOTONICS SYSTEM

BACKGROUND OF THE INVENTION

The present invention relates to the field of photonics and in particular to arrangements for controlling, routing or switching optical signals by wavelength selection.

An optical circulator as illustrated by way of example in FIG. 1 is a known photonic device for the unidirectional transmission of an optical signal or beam from one port to the next sequential port (i.e. from port 1 to port 2, 2 to 3, 3 to 4, etc), without allowing transmission in the reverse directions (i.e. 2 to 1, 3 to 2, 4 to 3, etc). Thus light input at port 1 is output at port 2, light input at port 2 is output at port 3, etc. Here the term "light" is used to include both visible and non-visible radiation e.g. optical signals suitable for the purposes of photonics. To operate on several beams, as is necessary when handling signals from multiple optical fibres, several optical circulators are conventionally required. To perform an all-optical add-drop function that separates channels carried on different wavelengths in an optical signal (i.e. wavelength division multiplexing (WDM) wavelength channels), would also require a multiplicity of optical circulators.

With the spread of WDM wherein a plurality of wavelength channels is carried by a single optical fibre, the need for a compact and cheap means for independently operating on large numbers of wavelength channels is becoming more acute.

A requirement in wavelength multiplexed multi-channel optical networks is to have fully flexible optical add-drop and cross connect functionality at nodes of the network. This means that any wavelength channel carrying data to that node can be dropped into any one of a number of receivers at that node and that any of the node's transmitters may reuse that wavelength to send data on from that node.

To achieve these functions requires switching and demultiplexing of the WDM wavelength channels. Tuneable reflective optical gratings can be used with optical circulators to sort a signal comprising WDM wavelength channels into two sets of wavelength channels. To carry out the add-drop function with 8, 16, 32 or more channels requires the sorting function to be repeated many times which requires the use of large numbers of filters and optical circulators.

SUMMARY OF THE INVENTION

The present invention provides a photonics system comprising an optical circulator, comprising a plurality of ports; a first port arranged to receive a plurality of spatially separate optical signals each comprising a plurality of wavelengths, the plurality of optical signals arranged to produce an array of spatially separate sources of light at the first port; the optical circulator arranged to pass the plurality of optical signals to a second port; a focussing means provided at the first port to produce at the second port an array of spatially separate images of the sources of light; a plurality of optical wavelength filters arranged at the second port, in which each of the plurality of optical wavelength filters is arranged to align with a different one of the plurality of optical signals at the second port, each of the plurality of optical wavelength filters for selectively reflecting a selection of the plurality of wavelengths comprised in the respective optical signal and selectively passing others of the plurality of wavelengths.

The present invention further provides a photonics system comprising a second optical circulator, and a plurality of further filters provided at certain ports of the second optical circulator for performing a similar function to the first optical circulator in which the first optical circulator and the second optical circulator are arranged in communication with each other so that optical signals issuing from a selected port of the first optical circulator enter the second optical circulator at an input port thereof.

The present invention further provides an optical network comprising the photonics system of the invention.

The present invention further provides a telecommunications network comprising the photonics system of the invention.

The present invention further provides a photonics system comprising an optical circulator, comprising a plurality of ports, a first port arranged to receive a plurality of spatially separate optical signals each comprising a plurality of wavelengths the optical circulator arranged to pass the plurality of optical signals to a second port, to produce a plurality of spatially separate optical signals at the second port; a plurality of optical wavelength filters arranged at the second port, in which each of the plurality of optical wavelength filters is arranged to align with a different one of the plurality of optical signals at the second port, each of the plurality of optical wavelength filters for selectively reflecting a selection of the plurality of wavelengths comprised in the respective optical signal and selectively passing others of the plurality of wavelengths.

BRIEF DESCRIPTION OF THE DRAWINGS

Embodiments of the invention will now be described by way of example with reference to the drawings in which:

FIG. 5 shows in cross section a third embodiment of the invention;

FIG. 6 shows in cross section a fourth embodiment of the invention.

DETAILED DESCRIPTION OF THE PREFERRED EMBODIMENTS

Figure 1:
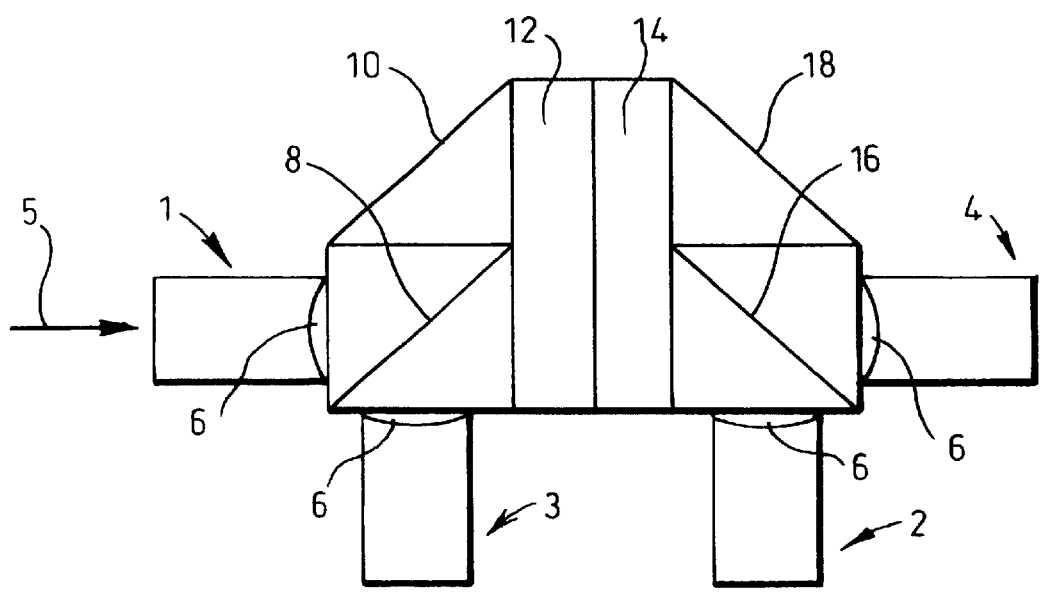
FIG. 1 shows a cross section through an optical circulator of the prior art.

Referring to FIG. 1, there is shown an implementation, by way of example, of an optical circulator of the prior art comprising four ports 1, 2, 3, and 4. It will be noted that operation of the optical circulator is not reciprocal in that light input at port 1 is transmitted to port 2 but not vice versa. The optical circulator will now be described in more detail with reference to the figure. In this embodiment, lenses 6 are positioned at the entry to the optical circulator at each of ports 1 to 4. The lenses function to focus light input at one port at the corresponding output port. Lenses are not essential as this function could be achieved by means of other focussing means such as suitably curved mirrors.

Light entering the optical circulator at port 1 will encounter polarising mirror 8. The polarising mirror 8 functions to split the light into two orthogonally polarised beams which travel along different paths through the optical circulator. For example, light input at port 1 will be split such that light with a first polarisation travels straight through the polarising mirror 8 whereas light with an orthogonal polarisation will be reflected through ninety degrees causing it to hit mirror 10 where it is reflected a second time. At the centre of the optical circulator are two polarisation rotators each of which acts to rotate the polarisation of incident light through an angle of forty-five degrees. The first polarisation rotator 12 acts reciprocally in that light passing in one direction (e.g. from left to right in the figure) will have its polarisation rotated clockwise and light passing in the opposite direction (e.g. from right to left in the figure) will have its polarisation rotated anti-clockwise. In contrast the second polarisation rotator 14 is a so-called Faraday rotator which acts in an non-reciprocal way. The directional properties of the Faraday Rotator material are influenced by magnetic fields and, in practice, a saturating magnetic field will be applied to it. Light passing through the Faraday rotator in a first direction (e.g. from left to right in the figure) will have its polarisation rotated in a first direction, say clockwise. Light passing through the Faraday rotator 14 in the opposite direction (e.g. from right to left in the figure) will have its polarisation also rotated clockwise. The effect of these two different types of polarisation rotator arranged together in the centre of the optical isolator so that all light input at any port must pass through both elements is as follows. Light passing through the rotators in a first direction (in our above example from left to right) will undergo a polarisation rotation in a clockwise direction of forty-five degrees in element 12 and a further rotation in a clockwise direction of forty-five degrees in element 14 resulting in an overall rotation of ninety degrees. However, light travelling through the rotating elements in the opposite direction (in our example above from right to left) will undergo a polarisation rotation in a clockwise direction of forty-five degrees in polarising element 14 and a contrary polarisation rotation of forty-five degrees in an anti-clockwise direction in element 12 resulting in an overall rotation of zero degrees, i.e. the light passes straight through with no overall change in its orientation of polarisation.

Operation of the optical circulator of FIG. 1 will now be illustrated by describing the passage of light through the optical circulator from port 1 to port 2. As mentioned above, light input at port 1 first passes through lens 6 and encounters polarising mirror 8 where that portion of the input light with a first polarisation passes straight through the polarising mirror, whilst light with the orthogonal polarisation is reflected by the polarising mirror through ninety degrees. The light passing straight through the polarising mirror will experience an overall rotation of polarisation of ninety degrees as explained above as a result of passing through polarisation rotation elements 12 and 14. The light will then encounter the second polarising mirror 16. This light now has an orthogonal polarisation compared with the light transmitted by the first polarising mirror 8 and will therefore be reflected through ninety degrees and directed out at port 2.

The portion of the input light with orthogonal polarisation which was reflected at the first polarising mirror 8 undergoes a second reflection through ninety degrees at mirror 10 and subsequently passes through polarisation rotation elements 12 and 14, undergoing an overall polarisation rotation of ninety degrees in exactly the same way as the light transmitted through the first polarising mirror 8, as described above. After leaving the polarisation rotation elements 12 and 14 the light is reflected again through ninety degrees by the second mirror 18 so as to enter the second polarising mirror 16 from the top, as shown in the figure. However the light entering the top of the polarising mirror 16 has a different polarisation due to the ninety degree rotation undergone in the rotational elements 12 and 14 and therefore passes straight through the second polarising mirror 16 to issue at port 2.

In a similar way light entering the optical circulator at any of the ports will be split according to polarisation and routed separately so as to issue from the appropriate port. The passage of light input at port 2 will now briefly be described to demonstrate the non-reciprocal operation of the optical circulator. Light input at port 2 with a first polarisation will be reflected in second polarising mirror 16 so that it passes through polarisation rotation element 14 and element 12 from right to left. As explained above this introduces no overall rotation in polarisation so that the light entering first polarising mirror 8 from rotational elements 12 and 14 has the same polarisation as the light reflected by second polarising mirror 16 with the result that this light is also reflected through ninety degrees by first polarising mirror 8 and hence it issues from port 3 rather than port 1. In a similar way, light input at port 2 and transmitted by second polarising mirror 16 will similarly be passed by first polarising mirror 8 (after reflection at mirrors 10 and 18 and passing through rotational elements 12 and 14) such that this light also issues from port 3.

Figure 2:
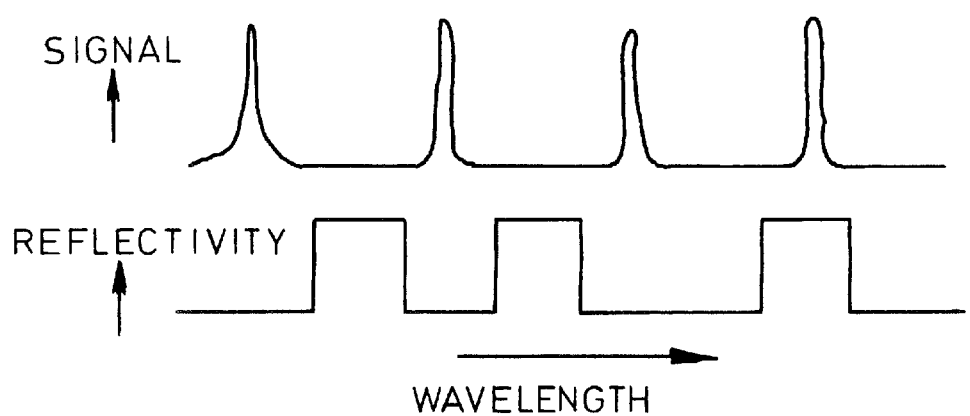
FIG. 2 illustrates in graphical form the operation of a fibre Bragg grating of the prior art in selectively reflecting a single wavelength channel.

The fibre Bragg grating (FBG) filter of the prior art will now be briefly described with reference to FIG. 2. The FBG finds applications in the field of photonics by providing a tuneable reflective optical filter. The conventional FBG filter consists an optical fibre or an array of optical wave-guides in which a series of Bragg defraction gratings have been arranged (e.g. by exposure to ultraviolet holographic radiation). The gratings are arranged such that they reflect incident light over a narrow band of wavelengths. In addition the wavelengths reflected may be adjusted by e.g. heating or stretching the fibre locally to a particular grating. An FBG filter arranged for use with wavelength channels would typically be fabricated such that the wavelength band at which the gratings reflected light just missed the wavelengths of respective WDM wavelength channels but, when a particular grating was activated, the reflected wavelength band would shift so as to include that of a desired wavelength channel which would then be reflected. Alternatively the FBG filter could be fabricated so that each grating reflects a WDM wavelength channel but, when activated, is detuned to pass that channel. The FBG filter thus provides a convenient way of extracting a particular WDM wavelength channel from a plurality of such channels being carried in a single fibre. FIG. 2 shows in the upper line a typical WDM signal comprising four wavelength channels. In the lower line the reflectivity of three FBGs is shown: the lower level of the line indicating transmission the upper level of the line indicating reflection. As can be seen from the figure, one FBG has had its reflection wavelength band shifted to coincide with the wavelength of one of the wavelength channels: which wavelength channel will thereby be separated from the other wavelength channels by reflection.

An arrangement for adding and dropping single channels using an optical circulator together with FBGs will be now be described with reference to FIG. 3.

Figure 3:
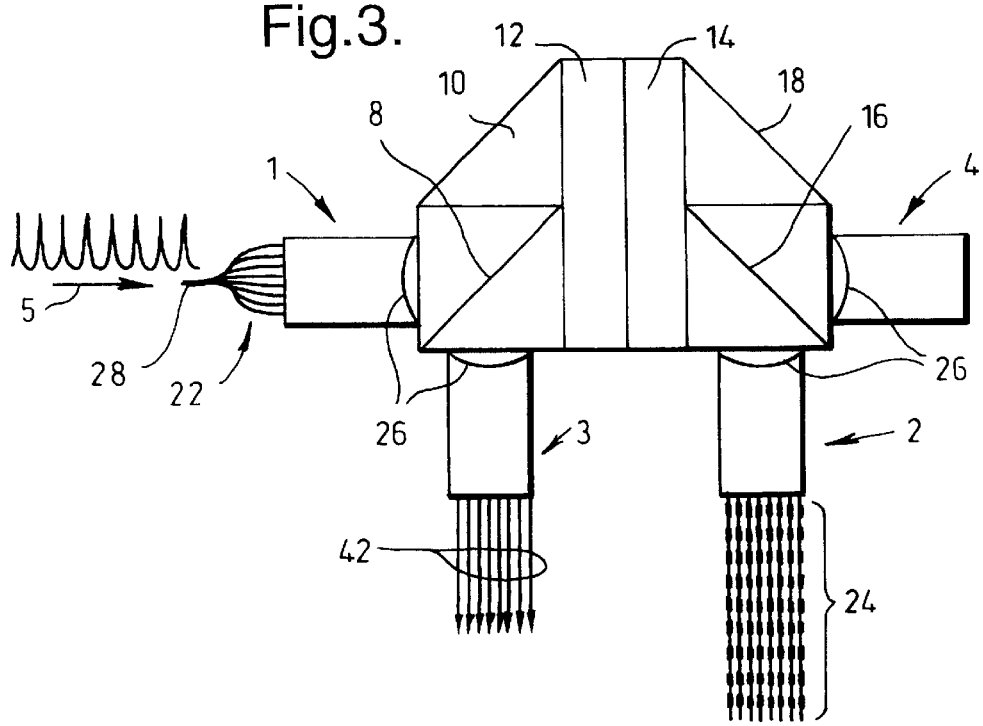
FIG. 3 shows in cross section a first embodiment of the invention.

FIG. 3 shows a photonics system according to a first embodiment of the invention in which a plurality of optical signals represented diagrammatically by the series of peaks 5 input on separate optical beams are circulated simultaneously in a single optical isolator and isolated by use of a plurality of FBG filters. Elements common to FIG. 1 are shown with the same reference numerals and will not be described further here.

The arrangement of the invention provides a multi-channel optical circulator (MCOC), by which is meant an optical circulator capable of independently routing a plurality of signals carried as wavelength channels: i.e. as different optical wavelengths. This embodiment differs from the prior art in that the input signal is power split into a plurality of separate beams each carrying the same information, i.e. all of the wavelength channels comprised in the original input signal. A conventional optical splitter 22 with a sufficiently broad transmission band may be used for this purpose.

With reference to FIG. 3 the splitter 22 is arranged to produce an array of light sources adjacent to port 1 of the optical circulator. A lens or other focusing means 26 is interposed between the array of light sources and the optical circulator input at port 1 and causes an image of the array of light sources to be produced at the corresponding output of the optical circulator (in this example, port 2). At port 2 a plurality of optical wavelength (eg. FBG) filters 24 is arranged, one filter arranged to align with each image of a light source produced at port 2 by the lens at the input to the optical circulator at port 1 so that light from each of the outputs of the optical splitter 22 enters a different one of the filters 24. Optical wavelength filter 24 comprises a series or "chain" of FBG elements, each element designed to "switch" (i.e. reflect or pass) a particular channel wavelength.

The optical wavelength filters 24 have the ability to selectively reflect one, or more, of the optical wavelengths (or "colours") corresponding to the wavelength channels arriving at the input to the optical circulator at port 1 depending on which of the FBG elements are activated. Light reflected in this way will create an array of sources of light adjacent to the second port of the optical circulator (port 2).

Hence each of the optical wavelength filters at port 2 receives all of the wavelength channels from the input at port 1. In operation each filter may be set to reflect a different wavelength (corresponding to a different wavelength channel) or a group of wavelengths back into the optical circulator. Light reflected back into the optical circulator at port 2 will exit at port 3. A focussing means at port 2, interposed between the optical circulator and the filters, causes an image of the array of sources of light at port 2 to be produced at port 3. Hence at port 3 an array of light sources may be created, each light source corresponding to a different one or several ones of the input wavelength channels. Any wavelength channels not reflected by a particular optical wavelength filter at port 2 will pass through the filter and may be transmitted out from the end of the filter remote from the port.

Alternatively each optical wavelength filter at port 2 may be set to reflect all except one of the wavelength channel input at port 1. If each filter is set not to reflect (i.e. is set to pass) a different wavelength channel, an array of light images may be created at the ends of the optical wavelength filters remote from port 2, each light source corresponding to a different one of the input wavelength channels.

At each of these remote ends of the optical wavelength filters an optical guide (e.g. fibre or waveguide, not shown) may be connected to guide onward transmission of wavelength channels passed by the filter. Similarly an array of optical guides 42 may be arranged at port 3 so as to guide onward transmission of any wavelength channels issuing from that port. Each port 3 optical guide would need to be accurately aligned with a corresponding image produced at port 3 from a source of light produced by one of the filters reflecting light back into the optical circulator at port 2.

Hence by controlling the reflectivity of the plurality of optical wavelength filters it is possible to selectively switch a plurality of wavelength channels using a single optical circulator so that any desired wavelength channel or desired combination of wavelength channels may be routed to any one of the output guides at ports 2 or 3.

Thus a flexible and compact multi-channel optical de-multiplexer and combiner for WDM is created using a single optical circulator.

Cross talk between channels may be kept to acceptable limits by achieving sufficiently small aberrations in the optics. The cost per channel will reduce as the number of channels increases. Waveguide array components (either one or two dimensional arrays) may be used to arrange the several input optical beams so that they may be imaged through the optical circulator system.

Figure 4:
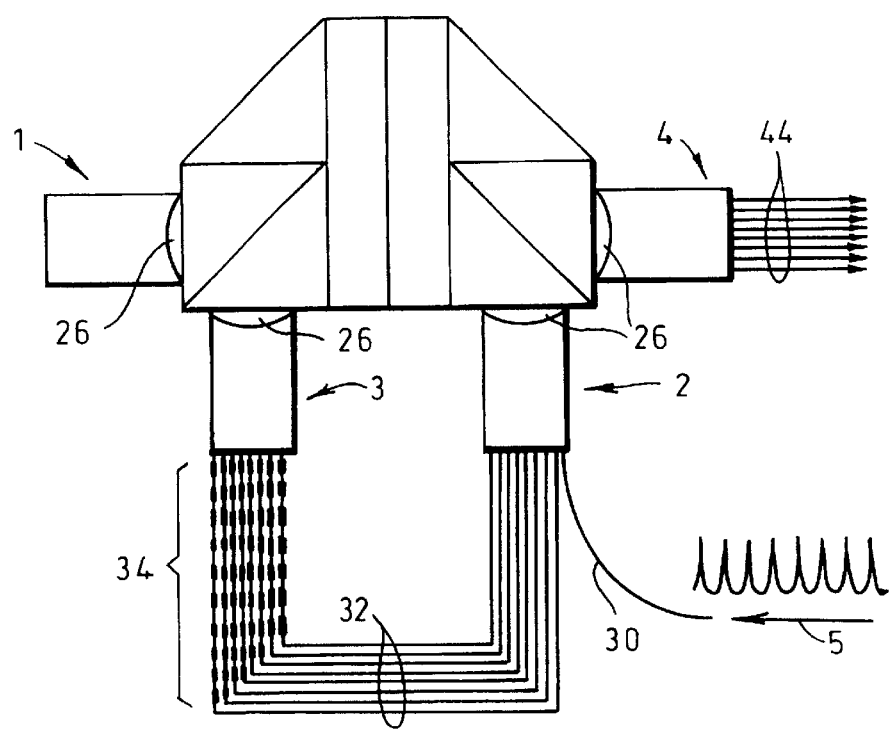
FIG. 4 shows in cross section a second embodiment of the invention.

FIG. 4 shows a second embodiment of the present invention. With reference to FIG. 4, the input signal 5 is taken to port 2 rather than port 1, however the actual port used for input is irrelevant as the invention will work in the same way independent of which port is selected due to the way optical circulators operate.

No splitter is used on the input signal which is fed to the input port (here port 2) on the optical circulator by means of a single optical guide 30 (i.e. fibre or wave guide). The input optical guide 30 shares the input port 2 with a plurality of other guides 32 looping around from the next port on the optical circulator (here port 3). In the arrangement of FIG. 4, port 3 effectively takes over the function performed by port 2 in FIG. 3. A focussing arrangement 26 at port 2 forms an image at port 3 of each light source, corresponding to each optical guide (i.e. both input and looped) terminating at port 2. At port 3, aligned with each of the images so formed, is an optical wavelength filter 34 (such as a fibre Bragg grating) that may be controlled to reflect or transmit a selected wavelength channel or channels differentiated on the basis of the wavelength of light used to propagate it.

A first one of the filters 34 at port 3 will therefore be aligned with the image of the input signal incident at port 2. This input signal will comprise all the wavelength channels carried by the input optical guide. This first filter may be controlled to selectively reflect one of the wavelength channels received from the input at port 2 back into the optical circulator at port 3. Light input at port 3 of the circulator will issue at port 4. The other wavelength channels, i.e. those not selected by this first filter for reflection, will issue from the end of the first one of filters 34 remote from port 3. This remote end of the filter is connected to one of the optical guides 32 looped round to terminate at port 2 at a different point from the input optical guide. The focussing arrangement 26 at port 2 creates a second image at port 3 of this looped around signal (which now contains all of the wavelength channels except that one selected by the first filter). This second image is aligned with a second one of the filters 34 at port 3 which is controlled to selectively reflect a second wavelength channel for issue at port 4. As this second filter is at a different position at port 3 from the first filter, the second wavelength channel selected will issue at port 4 in a different position to the first wavelength channel selected. Again the non-selected wavelength channels will propagate through the relevant filter and will again be looped around to port 2 in another one of the optical guides 32 that terminates at a different position to the first two guides. This looping-round is repeated in a similar manner with a different wavelength channel being selectively reflected by a filter at the start of each loop until each one of the wavelength channels has been selected to issue at a unique position from port 4. So for n input wavelength channels, n filters 34 and n−1 optical guides 32 looping from port 3 to port 2 will be required. Advantageously for a large number of wavelength channels (and therefore loops 32) an optical amplifier (not shown) may be integrated into one of the loops 32 to compensate for attenuation introduced. An array of optical guides 44 may be arranged at port 4 so as to guide onward transmission of any wavelength channels issuing from that port.

Hence the same function is achieved as the arrangement of the first embodiment, described above, but without the need for an optical splitter.

A further embodiment will now be described with reference to FIG. 5. Given the arrangement described in the second embodiment, above, if some of the input wavelength channels are not selected for output at port 4, it may be desirable to insert wavelength channels from another source.

As illustrated in FIG. 5, in this embodiment additional signals 36 are presented at port 1 via additional input optical guides 38 to produce an array of light sources adjacent to the input of the optical circulator at port 1. Focusing means 26 interposed between the optical circulator and the array of light sources at port 1 produces an image at port 2 of the light sources. The additional input optical guides 38 at port 1 are positioned so that the images generated at port 2 do not coincide with the input guide 30 but do coincide with some of the other guides 32 looping around from port 3. By virtue of the optical circulator operation, signals input at port 3 will propagate through the optical circulator and issue from port 4. With each image at port 2 of port 1 light sources aligned with one of the guides 32 as described above, a signal input at port 1 can be made to travel through a selected one of the guides 32 to one of the optical wavelength filters 34 at port 3. If this optical wavelength filter is set to pass the wavelength corresponding to a wavelength channel carried by that signal, then that wavelength channel will re-enter the optical circulator at port 3 and issue from port 4.

If the filter through which this additional wavelength channel passes at port 3 is set to not reflect any of the wavelength channels then (i) no radiation from the input signal at port 2 will be reflected back into port 3 at this position to issue from port 4 and (ii) all of the radiation from port 1 travelling via port 2 and the appropriate one of the optical guides 32 will pass through the corresponding one of the filters 34 to enter port 3 at the identical position as the radiation input from port 2 would enter had it been reflected back from the same one of the filters 34. As a result, the wavelength channel input at port 1 and passed by the corresponding filter at port 3, will issue from port 4 along the same one of the output optical guides 40 as the corresponding wavelength channel input at port 2 would do were it reflected by that filter at port 3.

If it were to be decided to include the wavelength channel input from port 2 in place of the corresponding wavelength channel input at port 1 all that would be needed is to activate the relevant one of the filters 34 at port 3 to reflect the wavelength corresponding to that channel.

A further embodiment will now be described with reference to FIG. 6. In this embodiment the number of passes made by the input signal through the multi-channel optical circulator (MCOC) required for multi-channel de-multiplexing and/or combining is reduced. In the arrangement of the previous embodiment (see FIG. 5), for n wavelength channels, n+1 passes through the MCOC are required together with n−1 loops between ports 2 and 3. As n, the number of wavelength channels, increases the signal attenuation becomes significant and the cost and complexity increase.

In the arrangement of FIG. 6 each of the wavelength filters 46, 50 and 54 is arranged to pass half of the wavelength channels received by that filter and to reflect the other half. The filters aligned at successive ports of the optical circulator are controlled to reflect a different selection of wavelength channels from the preceding filters. Hence for n wavelength channels, any one channel will pass through the circulator a maximum of $(\log_2 n)+1$ times and through $\log_2 n$ filters.

FIG. 6 shows an input signal consisting of eight wavelength channels (represented diagrammatically by the signal peaks 5) input at port 1, although the present invention may be used with more or fewer input wavelength channels. The filter 46 at port 2 reflects four of these wavelength channels so that the wavelength channels are split into two groups of four, one group being reflected back to port 2 so that they pass on to port 3 at a first position, the second group being transmitted through the filter and looped back to a second position at port 2 via an optical guide 48 to be propagated through the optical circulator to port 3 at a second position. This process is repeated at port 3 where each of the two groups of four wavelength channels is divided into two further groups (in this case of two wavelength channels each) by filters 50 and propagated back (following either reflection by filters 50 or looping back through optical guides 52) through the optical circulator to port 4 at four different positions. Again at port 4 the groups (now two wavelength channels each) are again split in two by filters 54 resulting in eight separate wavelength channels travelling back (following either reflection by filters 54 or looping back through optical guides 56) into the optical circulator at port 4 to issue from port 1, each at a different position. For eight channels, port 1 will need to be supplied with nine guides i.e. one for the input signal and eight guides for the outputs.

As before, by selecting the reflective characteristics of the optical wavelength filters 46, 50, 54, any of the input wavelength channels may be output to an arbitrary one of the output guides. This arrangement uses all four ports of the device to demultiplex eight channels.

Hence for eight channels, four passes will be required, the output issuing (assuming the design of optical circulator shown in the figure) from the same port as the input signal is applied to. If a signal is reflected by the filters at each of the three ports it would return to the input port at the same location as the input signal. To avoid one of the selected output beams being imaged from port 4 back onto the input channel at port 1 rather than a designated output channel, an extra optical guide loop 58 is used to take the appropriate signal issuing at port 4 to a different location on port 3, and from there (via a filter at port 4) to the output at port 1 at a different location to the input signal. For de-multiplexing more than eight channels, more passes are required than there are ports on the optical circulator. This means that some of the ports must be used more than once. This generates a problem in that it may result in the same location at a port being used more than once. There is a need for some means of shifting the position of an optical signal from one position at a port to a different position. This will happen automatically where a signal is transmitted through the relevant filter and looped back to the same port but for reflected signals extra measures will be required. One way of achieving this is to dedicate one port to a series of looped optical guides taking signals received at the port back into the optical circulator at different positions on the same port, thereby providing the opportunity for another "round-trip" via the ports of the optical circulator.

Another factor is that practical fibre Bragg grating filters are not capable of reflecting 100% of the selected frequencies so that, although a reflected signal can be restricted purely to a single channel, any transmitted signal will also have elements of any channels which have been selected for reflection and will therefore not be pure. As a result of this, ideally, every signal output from the MCOC de-multiplexer will be a reflected, rather than a transmitted, signal. Careful selection of the splitting algorithm may be necessary to achieve this. Alternatively, an additional reflection stage can be incorporated in the device to improve the wavelength purity of the selected wavelength channel.

In a preferred implementation of any of the above embodiments, the plurality of optical signals pass through the optical circulator as parallel beams.

The invention is not restricted to any particular form of optical circulator and the skilled worker would realise that alternative embodiments using other forms of optical circulator, e.g. with different numbers of ports, fall within the scope of the invention.

The skilled worker would also realise that if, for example, the number of passes through the optical circulator became excessively large due, for example, to a large number of different wavelength channels, the present invention could advantageously be implemented by a plurality of connected optical circulators without falling outside the scope of the present invention. In one embodiment of such an arrangement (not shown), the last port on a first optical circulator is arranged in communication with the first port of a second circulator. The optical circulators may be interconnected by way of optical guides or directly, in effect imaging from a penultimate port of a first optical circulator through to a second port of a second optical circulator, with the last port of the first and the first port of the second optical circulator either touching or closely adjacent to each other. Additional optical circulators could be connected in a similar way to form a "chain" of optical circulators. With optical circulators of limited port numbers, such an arrangement would allow any number of ports to be added subject to the appropriate boosting of signals, for example by optical amplifiers, as required.

What is claimed is:

1. A photonics system comprising an optical circulator, comprising a plurality of ports;
    a first port arranged to receive a plurality of spatially separate optical signals each comprising a plurality of wavelengths, the plurality of optical signals arranged to produce an array of spatially separate sources of light at the first port;
    the optical circulator arranged to pass the plurality of optical signals to a second port;
    focussing means for producing at the second port an image of each source of light, in which the images are spatially separate;
    a plurality of optical wavelength filters arranged at the second port, in which each of the plurality of optical wavelength filters is arranged to align with a different one of the plurality of optical signals at the second port, each of the plurality of optical wavelength filters for selectively reflecting a selection of the plurality of wavelengths comprised in the respective optical signal and selectively passing others of the plurality of wavelengths.

2. The photonics system of claim 1 comprising a beam splitter arranged at the first port to provide the plurality of spatially separate optical signals from a single input optical signal.

3. The photonics system of claim 1 in which the plurality of spatially separate optical signals received at the first port comprises one optical signal input from outside the photonics system and a plurality of optical signals passed by the plurality of optical wavelength filters.

4. The photonics system of claim 3 in which each of the plurality of optical wavelength filters comprises a first end arranged adjacent to the second port and a second end;
    the photonics system also comprising a plurality of optical guides each one arranged with a first end adjacent to the first port and a second end aligned with the second end of a different one of the optical wavelength filters, each optical guide for guiding one of the plurality of optical signals from the respective optical filter to the first port so as to enter the optical circulator at a different position at the first port from the input optical signal.

5. The photonics system of claim 4 comprising a third port arranged to receive one or more spatially separate additional optical signals, each comprising one or more wavelengths, the one or more spatially separate additional signals arranged to produce one or an array of spatially separate additional sources of light at the third port;
    focussing means for producing at the first port an image of each additional source of light, in which the images are spatially separate;
    the photonics system arranged to pass the additional optical signals via the optical circulator to the first port and from there via one or more of the plurality of optical guides to one or more of the optical wavelength filters at the second port;
    the one or more optical wavelength filters for selectively passing some or all of the one or more wavelengths associated with the additional optical signals to the second port.

6. The photonics system of claim 1 comprising a third port in which the first port is arranged to receive an optical signal comprising a plurality of wavelengths input at the third port, the input optical signal arranged to produce a source of light at the third port;
    focussing means for producing at the first port an image of the source of light at the third port;
    the photonics system also comprising an optical filter arranged at the first port, to align with the input optical signal at the first port for selectively reflecting a selection of the plurality of wavelengths comprised in the input optical signal and selectively passing others of the plurality of wavelengths;
    in which each of the optical filters arranged at a port is associated with an optical guide for looping back to the same port an optical signal comprising the wavelengths passed by the respective filter so as to provide a plurality of spatially separate optical signals at the port.

7. The photonics system of claim 6 also comprising an optical guide for passing an optical signal output at a first location at one port and inputting it at a different location at the same port or at a different port.

8. The photonics system of claim 1 comprising a second optical circulator, and a plurality of further filters provided at certain ports of the second optical circulator for performing a similar function to the first optical circulator and the filters;
    in which the first optical circulator and the second optical circulator are arranged in communication with each other so that optical signals issuing from a selected port of the first optical circulator enter the second optical circulator at an input port thereof.

9. The photonics system of claim 8 in which the first and second optical circulators are arranged in direct communication with each other.

10. The photonics system of claim 8 in which the first and second optical circulators are arranged in communication via a plurality of optical guides.

11. The photonics system of claim 1 in which the plurality of optical filters comprise Bragg gratings.

12. The photonics system of claim 1 comprising an optical amplifier arranged in the path of one of the optical signals external to the optical circulator.

13. An optical add-drop multiplexer comprising the photonics system of claim 1.

14. An optical network comprising the photonics systems of claim 1.

15. A telecommunications network comprising the photonics system of claim 1.

16. A photonics system comprising an optical circulator, comprising a plurality of ports;
   a first port arranged to receive a plurality of spatially separate optical signals each comprising a plurality of wavelengths;
   the optical circulator arranged to pass the plurality of optical signals to a second port, to produce a plurality of spatially separate optical signals at the second port;
   a plurality of optical wavelength filters arranged at the second port, in which each of the plurality of optical wavelength filters is arranged to align with a different one of the plurality of optical signals at the second port, each of the plurality of optical wavelength filters for selectively reflecting a selection of the plurality of wavelengths comprised in the respective optical signal and selectively passing others of the plurality of wavelengths.

\* \* \* \* \*